United States Patent [19]

Moore, Jr.

[11] Patent Number: 5,133,181

[45] Date of Patent: Jul. 28, 1992

[54] FUEL CONTROL SHUT-OFF SYSTEM

[75] Inventor: Robert G. Moore, Jr., Granger, Ind.

[73] Assignee: Allied-Signal Inc., Morristown, N.J.

[21] Appl. No.: 458,253

[22] Filed: Dec. 28, 1989

[51] Int. Cl.$^5$ .............................................. F02C 9/38
[52] U.S. Cl. .................................................. 60/39.281
[58] Field of Search ............................ 60/39.281, 734

[56]  References Cited
U.S. PATENT DOCUMENTS

| | | | |
|---|---|---|---|
| 4,608,820 | 9/1986 | White et al. | 60/39.281 |
| 4,716,723 | 1/1988 | Ralston et al. | 60/39.281 |
| 4,738,597 | 4/1988 | Agostino et al. | 60/39.281 |
| 4,837,697 | 6/1989 | Eisa et al. | 60/39.281 |

*Primary Examiner*—Louis J. Casaregola
*Attorney, Agent, or Firm*—Leo H. McCormick, Jr.; Larry J. Palguta; Robert A. Walsh

[57] ABSTRACT

A fuel management system (34) for a turbine engine having a metering valve (50) controlled by the input of an electronic computer (36) to a resolver (48). A head pressure sensor (67) responds to pressure differential across the fuel metering valve (50) to control a bypass valve (80) which allows a portion of the fuel available from a fuel supply conduit (58) to return to a fuel reservoir (28). A reference pressure controlled head bypass valve (80) utilizing pressures above ($P_1$) and below ($P_2$) a metering valve (50) as reference pressures during normal operation and a non-controlled reference pressure during shut-off to maintain a minimum fuel pressure required for control purposes during shut-off. The non-controlled pressure reference may be obtained as a pressure drop across a series (typically a pair) of small orifices or apertures. The non-controlled reference pressure is typically achieved as the intermediate pressure between a regulated (pcb) body pressure and the inlet fuel supply pressure ($P_1$).

3 Claims, 2 Drawing Sheets

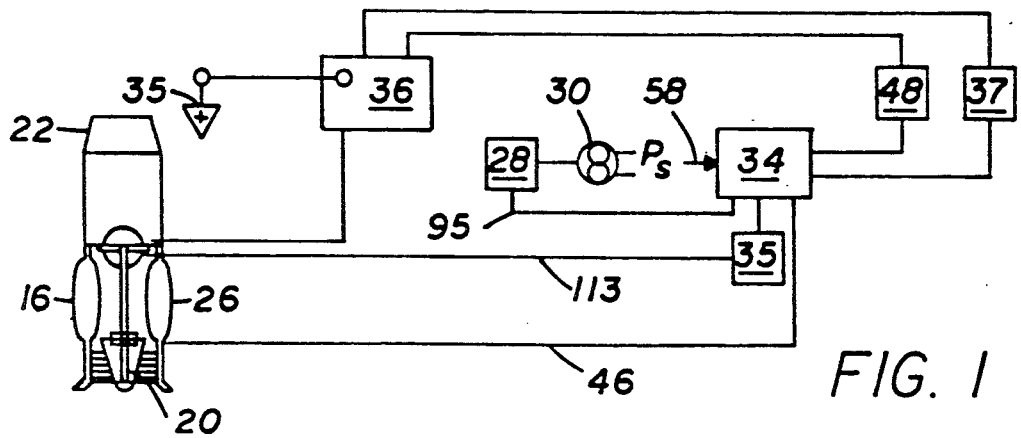
FIG. 1
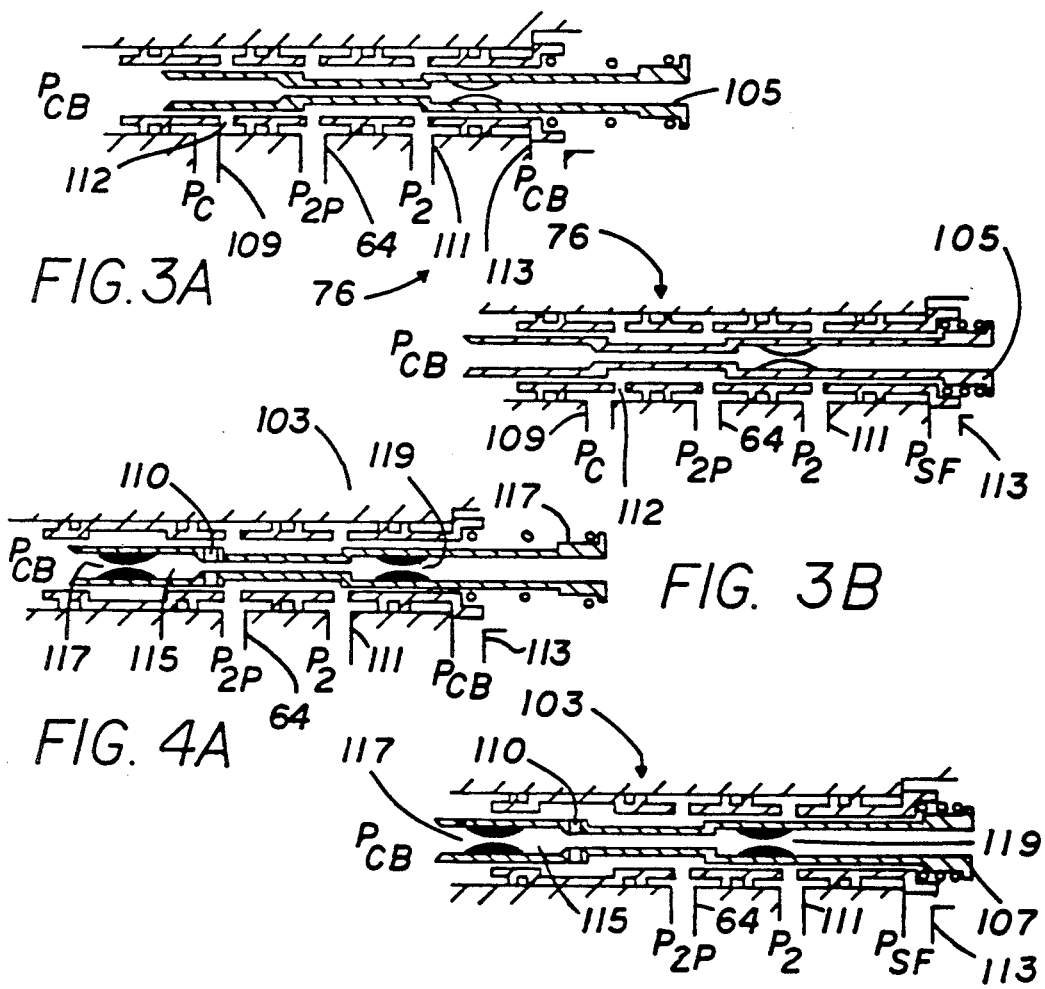
FIG. 3A
FIG. 3B
FIG. 4A
FIG. 4B

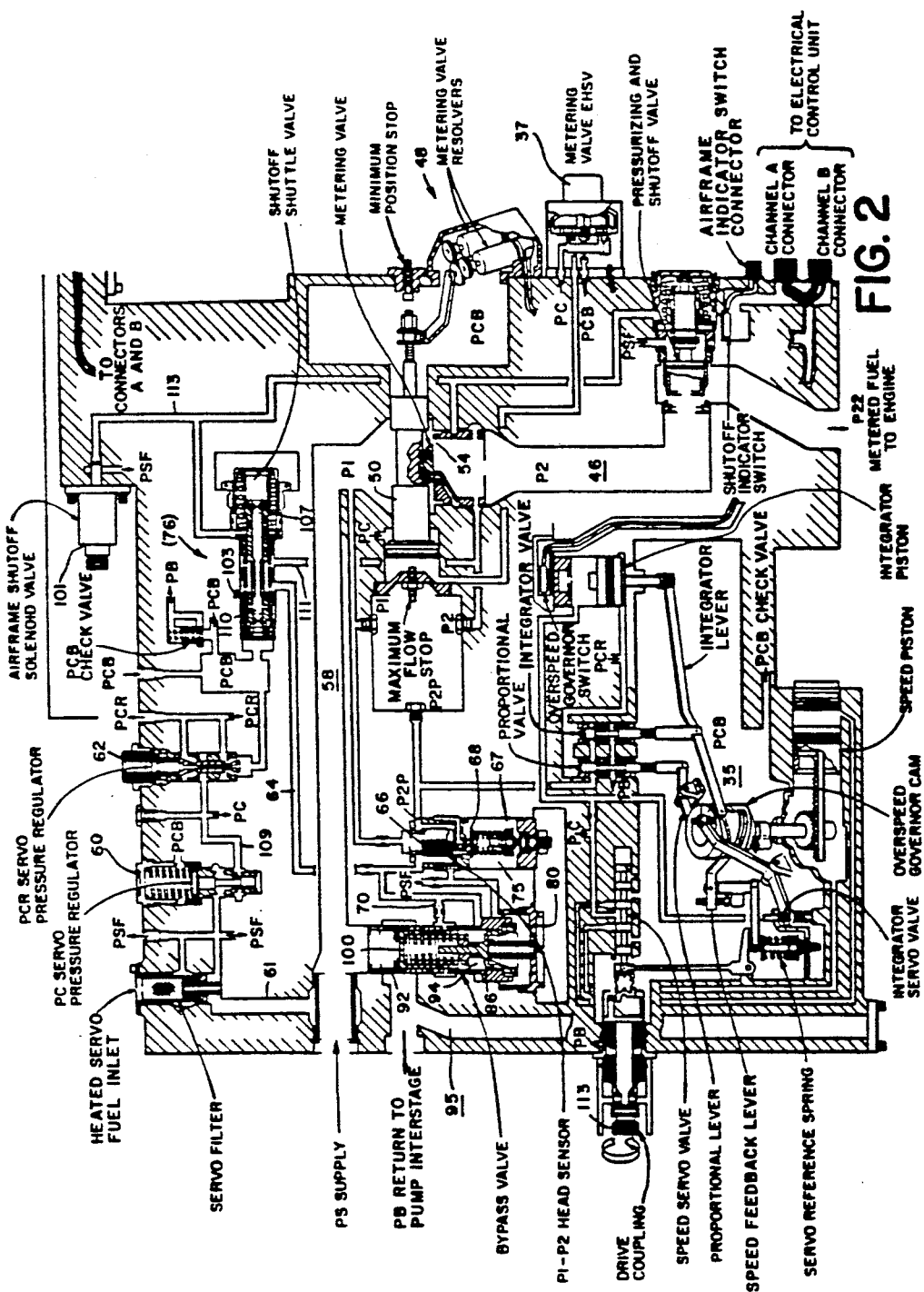

FUEL CONTROL SHUT-OFF SYSTEM

SUMMARY OF THE INVENTION

The present invention relates generally to an electronically controlled fuel management system as might be used in large aircraft turbine engine control and more specifically to improvements in the shut-off mode of operation of such fuel management systems.

In the Eisa et al U.S. Pat. No. 4,837,697 entitled OVERSPEED GOVERNOR FOR AN ELECTRONIC CONTROLLED FUEL SYSTEM and the patents referenced therein, the entire disclosures of which are hereby specifically incorporated herein by reference, there is disclosed a fuel control system suitable for use in large aircraft turbine engines. While the patent disclosure is primarily concerned with engine speed control, the hydraulic portion of the system (the fuel management system) provides an ideal environment for the present invention.

Large pressure pulsations have been noted in the fuel lines of aircraft utilizing fuel control systems of the type disclosed in the Eisa et al patent.

Among the several objects of the present invention may be noted the provision of a technique for eliminating the above noted large fuel pressure pulsations without limiting the control system capabilities; the provision of the versatile fuel control shut-off system; and the provision of a reference pressure controlled head pressure during normal operation and a non-controlled reference pressure during shut-off. These as well as other objects and advantageous features of the present invention will be in part apparent and in part pointed out hereinafter.

In general, an electro-hydraulic fuel management system includes a positive displacement pump and a bypass valve for diverting a controllable portion of the fuel supplied from the pump back to a fuel supply. The management system is operable in a normal mode as well as in a shut-off mode. In the normal mode, the bypass valve is effective to maintain the fuel supplied to an engine at a preferred pressure while, in the shut-off mode, the bypass valve maintains the fuel pressure at substantially the preferred pressure for management system control. A pressure regulator is effective in only the normal mode to provide a reference pressure level to the bypass valve. In the shut-off mode, the pressure regulator is inoperable for supplying an unregulated reference pressure level to the bypass valve. In the shut-off mode, the pressure regulator is blocked and effectively removed from the system.

Also in general, a head regulating valve system has a bypass regulator valve which utilizes pressures above and below a metering valve as reference pressure instead of the below the metering valve pressure during shut-off.

BRIEF DESCRIPTION OF THE DRAWING

FIG. 1, is a schematic block diagram of a turbine and fuel management system therefor;

FIG. 2 is a more detailed schematic diagram of the fuel management system for a turbine as shown generally in FIG. 1;

FIGS. 3a and 3b are illustrations of the prior art implementation of shut-off shuttle valve of FIG. 2 in the normal and shut-off positions respectively;

FIGS. 4a and 4b are views similar to those of FIGS. 3a and 3b, but illustrating the shuttle valve of FIG. 2 modified in accordance with the present invention in the normal and shut-off positions respectively;

Corresponding reference characters indicate corresponding parts throughout the several views of the drawing.

The exemplifications set out herein illustrate a referred embodiment of the invention in one form thereof and such exemplifications are not to be construed as limiting the scope of the disclosure or the scope of the invention in any manner.

DESCRIPTION OF THE PREFERRED EMBODIMENT

An operator supplies an operational input to power lever 35 to provide the electronic computing section 36 with an input. This input along with other operating parameters such as atmospheric air pressure, compressor discharge pressure, engine speed, inlet air temperature, altitude and engine temperature are evaluated in the development of an operational signal that is supplied by the electronic computer for moving metering valve 50 to define the opening of port 54 which allows the flow of fuel into the conduit 46 connected to the fuel manifold 26. The fuel supplied to fuel manifold 26 is burned in chamber 16 and a burning causes an expansion of the gasses therein which on exiting nozzle 22 rotates shaft 20.

A metered flow of fuel is supplied to fuel manifold 26 from fuel tank 28 by an engine driven positive displacement type fuel pump 30. A fuel management system 34 which includes a hydromechanical governor control section 35 and, in conjunction with the signal sensing and compute control 36, controls the flow of fuel to the manifold 26. The electronic sensing and signal computing control 36 is relatively conventional in that it receives electrical input signals indicative of a a number of engine parameters which are compared or otherwise processed to generate a resulting electrical signal which is suitably amplified and used to operate electro-hydraulic servo metering valve 37. A resolver 48 responds to such electrical signals to position the metering valve 50 and control the flow of fuel to the fuel manifold 26 by way of conduit 46.

A portion of the fuel flowing from pump 30 is diverted through conduit 61 to servo regulator valves 60 and 62 to provide an operational fluid having a substantially constant pressure $P_c$.

The rotation of shaft 20 is directly proportional to the fuel supplied to manifold 26. The restriction of the flow of fuel through port 54 causes a pressure drop across the metering valve 50 such that the fuel in conduit 58 has a pressure of $P_1$ and the fuel in conduit 46 has a pressure of $P_2$.

Fluid pressure $P_1$ is communicated to the inside of bellows 66 of head sensor 67 while the fluid reference pressure $P_2P$ is communicated to the outside of bellows 66 by way of shut-off valve 76 and conduit 64. The pressure differential acting on the movable member 68 positions one face therefor against a seat to prevent the communication of operational fluid having a fluid pressure $P_{sf}$ to chamber 75. At the same time, fluid pressure $P_2P$ is communicated by way of conduit 70 to chamber 94 in the bypass valve 80. This fluid pressure $P_2P$ acts on both integrator piston 86 and proportional piston 100 to position sleeve and lip of piston 100 with respect to ports 92 and set the size of the opening to return conduit 95. The integrator piston 86 which is controlled by the sensor 67 holds the pressure drop across the bellows 66 constant.

FIG. 3a illustrates the prior art shuttle valve 76 in the position for normal operation while FIG. 4a shows a shuttle valve 103 implementation of the present invention with the valve in the position for normal operation. In each of these figures, the respective pistons 105 and 107 are in their right most extreme position with the spool portions of the pistons aligned to connect conduits 64 and 111.

Piston 107 differs from piston 105 in that a transverse aperture 110 has been added to provide communication between chamber 115 and conduit 64 in the shut-off mode of FIG. 4b. The valve bodies differ in that opening 112 which provides communication to conduit 109 in FIG. 3b has been sealed off in FIGS. 4a and 4b.

At shut-off, the airframe shut-off solenoid valve 101 is actuated to supply high pressure in conduit 113 which move the pistons 105 and 107 of shut-off valves 76 and 103 respectively toward the left as viewed from the position of FIGS. 3a and 4a (the normal positions) to those of FIGS. 3b and 4b (the shut-off positions) respectively. In the shut-off position of FIG. 3b, piston 105 is effective to connect the regulated pressure from conduit 109 to conduit 64 and thus to the pressure sensor 67 as a reference value. However, in FIG. 4b, the conduit 109 is effectively blocked by sleeve 77 and supplies an unregulated intermediate pressure is supplied from the cavity 115 between the orifices 117 and 119 to conduit 64 as a reference pressure for bellows 66 of the head sensor 67. Pressure regulator 60 is effectively removed from the system when in shut-off and the "hunting" caused by this pressure regulator responding to pressure regulation introduced by the bypass valve has been eliminated.

Intermediate pressure cavity 115 has been located within the piston 107 of the shut-off shuttle valve 103 as a convenience. Other locations are clearly possible so long as a pair of restrictions such as the apertures or orifices 117 and 119 provide an intermediate pressure chamber connected to line 64.

From the foregoing, it is now apparent that a novel fuel management control system and shut-off arrangement therefor have been disclosed meeting the objects and advantageous features set out hereinbefore as well as others, and that numerous modifications as to the precise shapes, configurations and details may be made by those having ordinary skill in the the art without departing from the spirit of the invention or the scope thereof as set out by the claims which follow.

What is claimed is:

1. An electro-hydraulic fuel management system comprising a positive displacement pump and bypass valve for diverting a controllable portion of the fuel supplied from the pump back to the fuel supply, the management system being operable generally in the normal mode and in a shut-off mode, said bypass valve including means operable in the normal mode for maintaining the fuel supplied to an engine at a preferred pressure and including means operable in the shut-off mode for maintaining the fuel pressure at substantially said preferred pressure for system control; and a pressure regulator effective in only the normal mode to provide a reference pressure level to the bypass valve.

2. The electro-hydraulic fuel management system of claim 1 further comprising means operable only in the shut-off mode in which the pressure regulator is inoperable for supplying an unregulated reference pressure level to the bypass valve.

3. The electro-hydraulic fuel management system of claim 2 further comprising blocking means for effectively removing the pressure regulator from the system in said shut-off mode.

* * * * *